Dec. 8, 1970 M. BLAMOUTIER 3,546,514

SECONDARY-EMISSION CONDUCTIVITY TARGET COMPRISING HIGHLY POROUS STORAGE LAYER AND LESS POROUS INTERMEDIATE LAYER AS BASE FOR METAL FILM

Filed April 24, 1967 3 Sheets-Sheet 1

MICHEL BLAMOUTIER,
INVENTOR.

BY [signature]
Atty.

Dec. 8, 1970 M. BLAMOUTIER 3,546,514

SECONDARY-EMISSION CONDUCTIVITY TARGET COMPRISING HIGHLY POROUS STORAGE LAYER AND LESS POROUS INTERMEDIATE LAYER AS BASE FOR METAL FILM

Filed April 24, 1967 3 Sheets-Sheet 3

United States Patent Office 3,546,514

Patented Dec. 8, 1970

3,546,514
SECONDARY-EMISSION CONDUCTIVITY TARGET COMPRISING HIGHLY POROUS STORAGE LAYER AND LESS POROUS INTERMEDIATE LAYER AS BASE FOR METAL FILM

Michel Blamoutier, Paris, France, assignor to Compagnie Francaise Thomson-Houston-Hotchkiss Brandt, Paris, France, a corporation Filed Apr. 24, 1967, Ser. No. 633,060
Claims priority, application France, May 5, 1966, 60,347, Patent 1,491,300
Int. Cl. H01j 31/28, 31/48
U.S. Cl. 313—65 2 Claims

ABSTRACT OF THE DISCLOSURE

SEC-type target including the usual conductive signal plate and storage layer of porous, highly resistive, secondary emissive material bonded to one side thereof. Bonded to the outer side of the main storage layer is a surface layer of restrictive secondary-emissive material wherein the threshold voltage for which the secondary emission ratio exceeds unity is substantially higher than that in the material of the main layer. The electrons of the read beam scanning the exposed surface of the target will then be less likely to excite spurious secondary emission, permitting higher voltage excursions in the output signal.

This invention relates to target electrodes of the so-called secondary-emission conductivity ("SEC") type. Target electrodes of the SEC type are utilized in various types of electron discharge devices having signal recording and storage properties, including television camera tubes, and the like. In this disclosure particular reference will be made to camera tubes but it is to be understood the invention is not limited thereto.

The conventional operation of a SEC target will be described with reference to FIG. 1 of the attached drawings. The target is there shown as comprising a conductive signal electrode in the form of a very thin metallic plate 1 permeable to high-energy electrons, such as aluminum or magnesium foil 0.05 to 0.1 micron thick. Bonded to one side of the signal plate 1 is a so-called storage layer 2 comprising a highly porous deposit of high-resistance material having good secondary-emission properties, such as potassium chloride, barium fluoride or magnesia. which may be of the order of 25 microns in thickness. In use, it may be assumed for illustration that a picture beam of primary photoelectrons is emitted from a photocathode positioned to the left of the target assembly of FIG. 1. The photocathode may have a scene optically projected thereon or it may be otherwise illuminated or irradiated to emit photoelectrons at density rates proportional to the degree of illumination or irradiation of its elementary surface areas. The photoelectrons are accelerated and focused on the target assembly so as to strike the signal plate side of it with considerable energy, that is, high velocity. These high-energy primary electrons penetrate the signal plate 1 without being appreciably absorbed by it and into the porous storage layer 2 in which they excite secondary emission within the pores of the layer. The secondary electrons emitted within the pores of storage layer 2 are removed by means of a suitable electric extracting field, and their removal leaves positive charges or holes in the storage layer. The distribution pattern of these positive charges across the surface 3 of the storage layer is an inverted replica of the pattern of incident primary photoelectrons and hence reproduces the brightness distribution pattern across the scene projected on the photocathode.

This charge distribution pattern is read by means of a scanning beam of low-energy, i.e. slow, read electrons directed at the surface 3 from an electron gun which beam is deflected in scanning relation across said target surface 3. The scanning beam is operated at such a potential that the read electrons just neutralize the positive charges in the sequentially scanned areas of the target surface, thereby erasing the charge pattern. Due to this sequential charge neutralizing or erasing action the signal plate electrode 2 can deliver a variable-current signal on an output line connected to it, which at any instant of time will represent the degree of illumination of the target area being scanned at that instant and constitutes the useful output signal from the device.

An alternative method of utilizing the low-energy scanning or reading electron beam, as applied for example in image-orthicon camera tubes, instead of deriving an output signal on a line connected to the signal plate 1, is to collect the read electrons reflected back from the read surface 3 of the storage layer in an electron multiplier for example, and use the resulting variable current as the output signal from the device. This invention is to be understood as applicable in conjunction with both reading methods just described, although particular reference will be made in the disclosure to the first method.

Secondary-emission conductivity (SEC) target structures, as just defined, are to be distinguished from the so-called electron bombardment induced conductivity (or "EBIC") target structures, even though the two types of structure may frequently be used in the same general type of electron discharge tube device. In an EBIC target the requisite transverse conductivity through the target structure is achieved, not through the secondary electron emission within the ports of a porous storage layer, but instead through the displacement of charge carriers through the atomic crystal lattice of the storage layer. In an EBIC target, therefore. it is essential that the storage layer be made, at least in part, of a suitable high-resistance or semi-conductive material in compact form. An outstanding advantage of SEC targets over EBIC targets lies in the elimination of the appreciable and difficultly-controllable delays or time constants that appear in the operation of EBIC targets due to uncontrollable impurities and defects present in the crystal lattice of the target material. It is to be understood that the present invention is directed to SEC as distinct from EBIC target structures.

In the practical operation of SEC targets the following difficulty has been found to arise. While in the theoretical mode of operation outlined above the read electrons should at all times reach the target with a low energy just sufficient to neutralize the local positive charge at the target surface and this energy in theory is insufficient to excite secondary emission at the scanning surface of the target, such is not always the case in fact. In target areas of intense irradiation by the primary or "picture" electron beam, corresponding for example to highlights of the scene projected on the photocathode, the potential may momentarily become so high that the read electrons strike the target surface with sufficient energy to excite secondary smission therein. The spurious secondary electrons excited by the read electrodes are removed by the extracting field, increasing the positive charge at the scanned target area, up to a saturation point. The desired charge neutralizing action of the read beam is thus locally defeated. The practical result is that the output signal is correspondingly saturated or clipped, and that the bright areas of the output image are not rendered with their full brightness but appear relatively dark.

To overcome this serious defect it has been customary to provide a so-called stabilizing grid electrode in the form of a fine mesh wire screen positioned very close to the scanned surface of the target assembly, and connected to such a voltage as to limit the potential at all points of the target surface to a level lower than that necessary to permit the read electrons to excite secondary emission therein. However, the stabilizing grid so arranged has itself introduced a number of drawbacks. First, by imperatively limiting the potentials at all points of the target surface to the relatively low level required to preclude spurious secondary emission in the conventional target structures, the maximum permissible excursions of the useful output signal is correspondingly limited. Furthermore, in conventional SEC target assemblies the stabilizing grid if it is to be effective has to be positioned extremely close to the target surface, thereby introducing high capacitance into the output of the device. This also has had adverse effect on the output signal.

Objects of this invention include the provision of an improved SEC target structure which will be less susceptible to spurious secondary emission as excited by the scan or read electron beam; one in which the amplitude excursions of the output signal can be safely increased over what has heretofore been possible without introducing objectionable brightness instability into the resulting output picture; and one in which the output capacity of the device in which such target is used can be substantially diminished. Other objects are to provide improved electron discharge devices of the class including image converter and brightness amplifier tubes, television camera or pickup tubes, memory storage tubes and the like, having improved efficiency and performance owing to the incorporation of improved SEC target srtuctures therein.

An improved SEC target structure according to this invention comprises, in addition to the usual conductive signal plate permeable to high-energy primary electrons and a main storage layer of porous, high-resistivity, secondarily-emissive material bonded to one side of the signal plate, an additional or surface layer bonded to the outer side of said main storage layer, which surface layer comprises high-resistivity, secondarily-emissive material so selected that the threshold voltage for which the secondary emission ratio of said material exceeds unity, is substantially higher than that in the material forming in the main layer.

Owing to this provision the read electrons striking the exposed surfaces of the improved target structure will be less liable to excite spurious secondary emission therein than would be the case in the absence of the surface layer of the invention. At the same time, the over-all secondary-emission efficiency and gain of the target structure as a whole is not substantially reduced, as it would be if the entire storage layer were made of the material used for the surface layer of the invention. As a result, it becomes superfluous to impose any relatively drastic limitation on the maximum potential attainable at the surface of the target, whereby the maximum permissible amplitude excursion of the useful signal may be increased. Other advantages of the invention as summarized above will appear as the disclosure proceeds.

FIG. 1, already referred to above, is a greatly enlarged and stylized sectional view of a conventional SEC target structure of the general type to which the invention relates;

Figure 2:
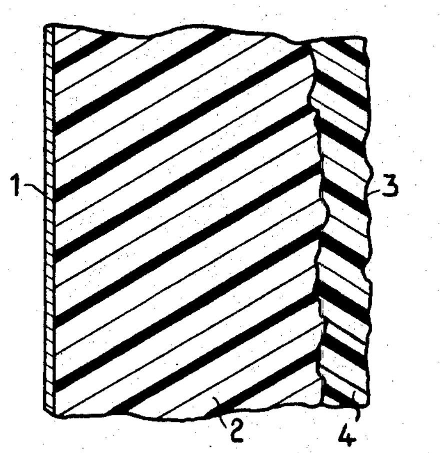
FIG. 2 is a similar view of an improved SEC target structure.

As shown in FIG. 2, an improved secondary-emission conductivity (SEC) target assembly according to this invention comprises a signal electrode in the form of a thin metal diaphragm or plate 1 permeable to high-energy electrons, such as a foil of aluminium or magnesium metal about from 0.05 to 0.10 micron thick; a highly porous layer 2 comprising electrically resistive material having high secondary emission properties, bonded to one side of signal plate 1; and an additional or surface layer 4 comprising electrically resistive material having generally lower secondary emission properties than those of layer 2, as will be specified in greater detail presently, which surface layer 4 is bonded to the outer side of layer 2 and presents the exposed surface 3 to a beam of scanning or reading electrons. Surface layer 4 is porous though preferably less so than main layer 2.

By way of example the main storage layer 2 may be about from 15 to 30 microns, e.g. 25 microns thick, and surface layer 4 may be from 2 to 10 microns, e.g. 5 microns, thick. The main layer 2 has high porosity, having an apparent density of the order of 2% of the true density of the material from which the layer is made when in compact form. The surface layer 4, may have an apparent density of e.g. about 20% that of the material from which said layer 4 is made, when in the compact state.

The main storage layer 2 may be made from any of various resistive secondary-emissive materials conventionally used in SEC targets, typical examples being potassium chloride, barium fluoride, and magnesia.

The surface layer 4 is made from a material having high resistivity and some secondary-emission properties, but so selected that the voltage threshold value for which its secondary-emission ratio exceeds unity (what may be termed the divergence voltage threshold value of the material), is substantially higher than it is for the material comprising the main storage layer 2. This will be better understood from the following explanations made with reference to FIGS. 5 and 6.

Figure 5:
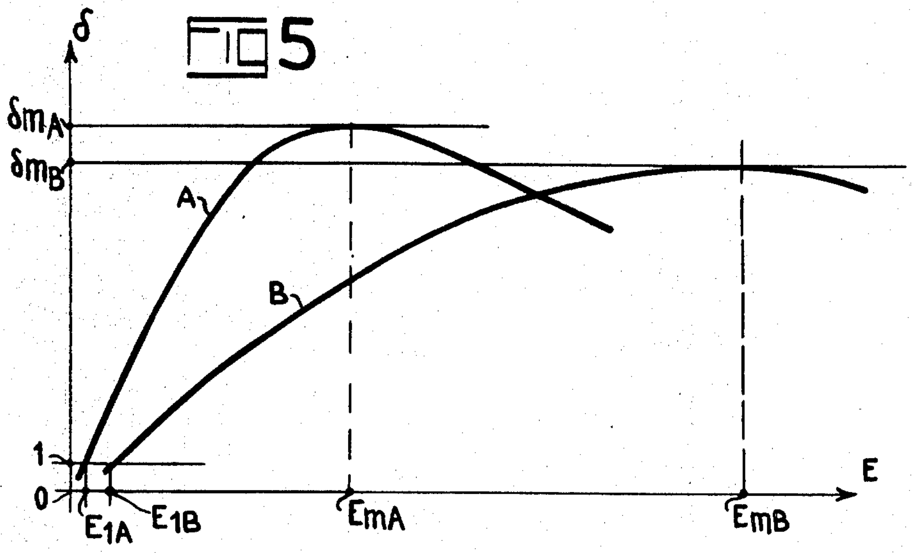
FIG. 5 is a simplified graph showing the variations of the secondary emission ratio as a function of electron accelerating voltage or energy, in the case of two different secondarily-emissive materials used in a target structure according to this invention.

Referring to the graph of FIG. 5, the abscissae indicate electron energies or accelerating voltages E, and ordinates indicate secondary emission ratios $\delta$. The curves A and B indicate in a general way the variations of $\delta$ with E for two different substances, such as the substances forming the layers 2 and 4 in FIG. 2, respectively. For all known secondary-emissive substances the quantity $\delta$ first increases with E, exceeding unity as the voltage E exceeds the afore-mentioned divergence threshold value $E_1$, and reaching a maximum value $\delta_m$ for a certain value $E_m$ of the voltage, after which the ratio drops slowly, as shown for curve A. The secondary-emissive substances generally used to provide the main layer 2, e.g. potassium chloride, have a relatively high value of $\delta_m$ and rather low value of $E_m$, to ensure good emission efficiency at reasonable voltage values. As shown by curve A, a substance having such characteristics will have a low value of the threshold voltage $E_{1A}$, of the order of only about 10 to 20 volts, and this is conducive to the instable operation described above. According to this invention, the substance constituting the additional layer 4 is selected to have a secondary-emission curve of the general character indicated at B, wherein the threshold value $E_{1B}$ is substantially higher; as examples, calcium fluoride, silica, silicon monoxide, for which the threshold value $E_{1B}$ is of the general order of 55 volts or higher, may be used. It will be understood that the provision of a surface-layer 4 having the character described at the output side of the target assembly, which is the side scanned by the slow electron beam, will reduce the likelihood of the scanning electrons producing the undesired secondary emission at the voltages used, and will thereby greatly reduce or eliminate the undesirable saturation effect noted above.

At the same time, the presence of the additional layer 4 will not reduce the over-all efficiency of the target assembly as would be the case if the entire secondary-emissive portion of the target assembly were made out of a material having a secondary-emission curve of the general form shown at B. An assembly thus constructed would have an unacceptably low over-all secondary emission efficiency because the mean ratio $\delta$ for such a material would be considerably lower than for a material of the conventional type over the range of practical operating voltages, as will be immediately apparent from a comparison of curves A and B in FIG. 5. As shown, the materials used according to the invention (curve B) have a maximum at a voltage value $E_{mB}$ which usually is so high that only very high energy incident primary electrons would generate an appreciable secondary current.

Remarkably, the composite secondary-emissive layer of the invention brings with it an additional advantage in the form of an improvement in the output signal/noise ratio, as a consequence of the low value of the $\delta$ ratio for potential values below $E_1$. This will be apparent from a consideration of FIG. 6, which illustrates more precisely than does FIG. 5 the shapes of the curves A and B for low values of the coordinates. The B curve is seen to retain lower values of the $\delta$ ratio consistently for all voltage values below the threshold. It is advantageous to have low values of the secondary emission ratio $\delta$ in the normal range of scanning electron velocities, i.e. $E<E_1$, since this improves the landing efficiency of the scanning electron beam, reducing back-scatter and increasing the output signal current derived from a scanning beam of given intensity. This in turn results in an improved signal to noise ratio as indicated above, or alternatively makes it possible to reduce the diameter of the scanning beam without reducing the output signal strength, so that image resolution is improved.

Figure 6:
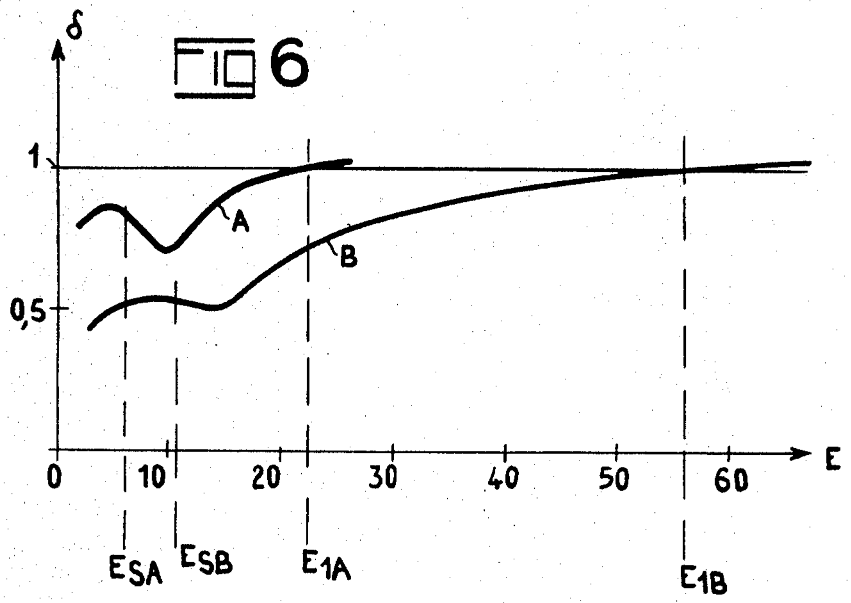
FIG. 6 is a graph having the same coordinates as in FIG. 5 but expanded to illustrate in greater detail the variations of the secondary emission ratio for low values of accelerating voltage.

In connection with the shapes of the curves A and B as they stand out from FIGS. 5 and 6, it will be noted the the two curves are geometrically similar in that if the curves were to be redrawn using the reduced, dimensionless coordinates $\delta/\delta_m$ and $E/E_m$, they would substantially coincide. It has been found experimentally that this law applies to a wide variety of materials and possibly to all materials. It is partly on this law of similitude that the feasibility of the invention is based.

The peculiar shape of the curves in the low-voltage range shown in FIG. 6 and involving inverse-slop portions, is explained by the composite nature of the secondary-emission ratio $\delta$. It is noted that the ratio $\delta$ considered according to the invention is an over-all secondary emission ratio, i.e. the ratio of the sum of elastically reflected incident electrons, plus the secondary electrons released at the surface 3 or the porous target assembly, plus the secondary electrons released inside the pores of said assembly and diffusing to said surface, divided by the number of incident electrons. In a very low-energy region below the characteristic values $E_{sA}$ and $E_{sB}$ of the curves A and B relating to the respective materials, situated in the regions of inverse slope, the number of elastically reflected incident electrons predominates over the number of released secondary electrons.

It should be understood that a precise determination of the shape of the secondary-emission curves such as A and B is not essential for the purposes of the present invention. Such a precise determination is difficult in view of the experimental difficulties encountered in maintaining completely uniform crystallization conditions, surface state and other such factors all of which may exert a marked influence over the measured secondary-emission ratios. There are, in fact, rather considerable discrepancies in the characteristic values of such curves in the published literature currently available. Such uncertainty is immaterial as far as this invention is concerned. The important point in this respect is that the material selected for the surface layer 4 according to the invention should have a "divergence threshold" value ($E_1$) high enough to ensure that there will be no substantial secondary emission produced by the read electrons, even for the highest specified values of target potentials that may be encountered in the normal operation of the target. Usually, this will be the case if the material used for the surface layer 4 has an over-all secondary emission ratio $\delta$ less than about 0.7 for incident electron energies of about 15 electron-volts.

To the extent that a relatively accurate quantitative determination of the secondary-emission curves relating to various materials can be made at the present time, the following further numerical data can be indicated for the curves such as A and B characterizing the substances from which a composite SEC target structure according to the invention is composed.

For the substances in the main layer 2, the theshold value $E_1$ may be in the range from 10 to 25 volts, a range of from 10 to 20 volts being preferred. The optimal voltage value $E_m$ may be in the range from 200 to 500 volts. The conditions just indicated are satisfied, inter alia, for the following substances: potassium chloride, barium fluoride, magnesia.

For the substances in the surface layer 4, the threshold value $E_1$ may be in the range from 40 to 70 volts, a range of from 50 to 60 volts being preferred. The optimal voltage value $E_m$ may be in the range from 1500 to 4000 volts. These conditions are satisfied, inter alia, for the following substances: calcium fluoride, silicon dioxide, silicon monoxide.

The ranges just indicated apply to the materials tested in compact or solid form, rather than the porous state in which they are used in the target structures according to this invention. It is emphasized once again that the ranges are indicative rather than restrictive, in view of the experimental difficulties encountered to date.

Figure 3:
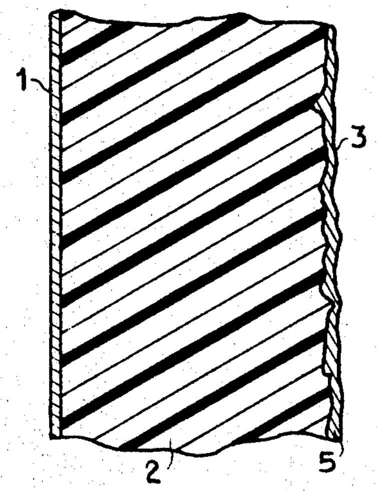
FIG. 3 is a similar view of a modified form of the invention.

According to a further form of the invention illustrated in FIG. 3, the spurious secondary-emission at the scanned surface 3 of the composite target assembly may be reduced through the provision of a very thin coating layer 5 of a suitable metal overlying the main secondary-emissive porous layer 2 of the target assembly, the metallized layer 5 replacing the layer 4 described in the first form of the invention with reference to FIG. 2. The metal comprising layer 5 is selected from within the group of metals having a high threshold voltage $E_1$, such as silver, gold, and platinum. The metal is deposited, as by the techniques later described herein, in a porous condition. The depth of the metallic layer 5 is selected small enough and its porosity high enough so that, in spite of the high electric conductivity of the metal used, the resistance of the porous metal layer as measured parallel to the general plane of surface 3 is quite high, effectively preventing any substantial leakage of charges across the surface 3 during the periods between successive impacts of the scanning electron beam. Preferably the surface resistance of the metal layer 5 should be more than about $10^{12}$ ohms per square. It has been found that this condition is readily achievable, as by providing the metallized coating 5 as a film coating the individual grains at the surface of main layer 2, of the order of 0.01 micron the metal having a density of about 20% its compact density.

Figure 4:
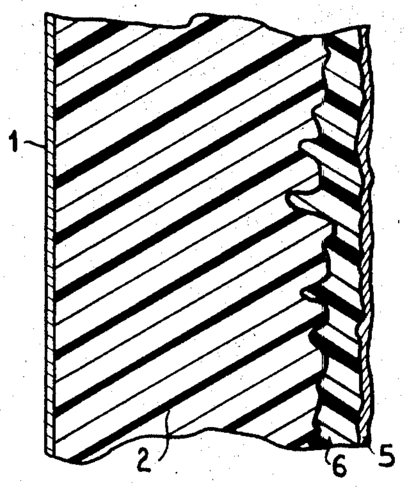
FIG. 4 is a similar view of another modified form.

In the form of the invention shown in FIG. 4 the target assembly differs from that shown in FIG. 3 in that there is interposed between the main porous emissive layer 2 and the porous emissive metallic coating 5, a sub-layer 6 whose main function is to provide a relatively smooth base for the metal coating 5. Sublayer 6 may conveniently comprise the same material as that in the main layer 2 but having a lower degree of porosity. However, other substances having suitably high electrical resistivity, porosity and secondary emissive properties may be used for the sublayer 6. It will be understood that the provision of sublayer 6 prevents deep penetration of the metal coat 5 into the pores of main layer 2 and facilitates uniform depth control of said metal coat.

In the practical construction of the target assemblies of the invention, the following exemplary procedures may be used.

First referring to the form of embodiment of FIG. 2, the basic assembly including metal electrode 1 and porous layer 2 may be prepared by any conventional process of evaporation-deposition of e.g. potassium chloride to a depth of about 25 microns over an aluminium foil 0.1 micron thick, the potassium chloride having an apparent density of about 2% of the true density of compact KCl. The additional layer 4 of the invention may then be applied by evaporation-depositing silicon in an atmosphere of argon at a pressure of about $5.10^{-1}$ mm. Hg, and then oxidizing the deposited material in situ in oxygen at atmospheric pressure, to provide a layer of silicon dioxide (and/or silicon monoxide) about from 3 to 8 microns deep. The silicon layer when thus formed had an apparent density of the order of 20% of its true compact density and penetrated the pores of the underlying potassium chloride layer to a depth of several microns.

Turning to the embodiment of FIG. 4, the intermediate sublayer 6 may conveniently be provided by the simple expedient of decreasing the pressure at the end of the initial step of evaporation-deposition of the potassium chloride, e.g. down to about $5.10^{-2}$ mm. Hg for a period of 5 minutes, so as to provide the sublayer 6 having a depth of about 3 microns and a mean apparent density of 10–20% the true density of compact KCl.

In either of the embodiment of FIG. 4 and FIG. 3, the metal layer 4 such as gold may be evaporation-deposited thermally in an inert gas at a pressure of $5.10^{-2}$ mm. Hg so as to provide a substantially uniform metal film about 0.01 micron thick. In the case of FIG. 3, a metal film of the indicated thickness coats the individual grains in the surface region of the porous main layer 2.

Figure 7:
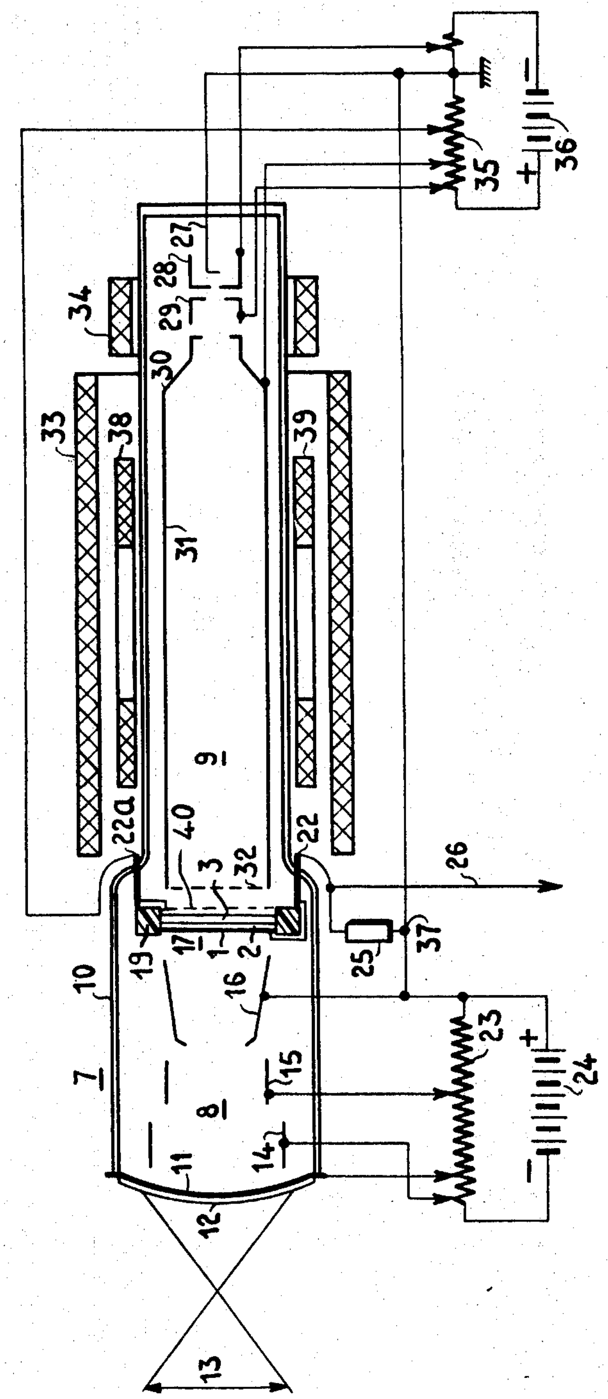
FIG. 7 is a diagrammatic view in longitudinal section of a pick-up tube embodying an improved SEC target electrode according to the invention.

FIG. 7 illustrates a camera tube embodying the improved target assembly of the invention. The camera tube generally designated 7 can be considered as comprising an input-output section 8 and a scanning section 9, arranged in a common evacuated envelope 10. The input-output section 8 includes a photocathode 11 comprising a suitable photoemissive layer deposited on the inwardly concave end face 12 of envelope 10. Thus the photocathode 11 will, in the operation of the tube, emit photoelectrons with a local density from each point thereof corresponding to the local brightness at that point of an image formed on the photocathode by projecting a scene 13 through a suitable optical system not shown. Disposed in the input-output section 8 is a set of coaxial accelerating and focussing electrodes 14, 15 and 16 connected to suitable potentials relative to cathode 11, as later disclosed, so as to accelerate the emitted photoelectrons and focus them upon a target assembly 17 of the secondary emission conductivity type constructed according to this invention. As earlier described target 17 comprises a signal electrode 18 which may comprise a thin aluminium foil 0.1 micron thick having bonded to the side thereof remote from the phootcathode a first porus secondary emissive layer 20 which may be made of potassium chloride or magnesia 20 microns thick, followed by a second porous emissive layer 21 which may comprise silica, about 5 microns thick. The resulting target assembly 17 which may be constructed by any of the procedures earlier disclosed herein, is supported in a mounting ring 19 of insulating material such as ceramic. Ceramic ring 19 is supported in tube envelope 10 by means shown as including the axially extending metal rods 22 and 22*a* serving as electric connectors as will be presently described.

The electric supply means for the input-output section 7 comprises a high-voltage D-C source 24 having a potentiometer resistance 23 connected across it with a plurality of voltage taps along the resistance, connected to the various electrodes as shown. By way of example, photocathode 11 may be connected to a −10,000 volts tap of resistance 23, and the accelerating and focussing electrodes 14, 15, 16 may be connected respectively to −11,000 volts, −8,000 volts and 0 volt connections of the resistance. The output electrode 18 of the target 17 is shown connected by way of connector rod 22 and a load resistor 25 to the grounded reference or 0-volt terminal 37 of the source. Connected to rod 22 between the signal electrode 18 and load resistor 25 is a signal output line 26.

The scanning section 9 comprises an electron gun positioned in the end of the envelope 10 remote from photocathode 11 and comprising a heated cathode 27 followed by a series of coaxial electrodes including Wehnelt or control electrode 28 and positive electrodes or anodes 29 and 30. The final anode 30 has a cylindrical tube 31 extending from it towards the target 17 and terminating somewhat short thereof with a fine-mesh field grid 32, supported across the end of tube 31 at a distance of e.g. about 3 mm. from the surface of the end layer 21 of target 17. The usual electromagnetic coils are provided around the scanning section of the tube envelope 10, including focussing coil 33 and alignment cell 34, and two pairs of mutually perpendicular deflection yokes one of which is shown as comprising the pair of coils 38 and 39.

The electric power supply means for the scanning section 9 comprises a relatively low voltage D-C source 36 having a potentiometer resistance 35 connected across it with a plurality of voltage taps connected to the scanning beam control electrodes as shown. Thus, the cathode 27 is shown connected to the reference or zero voltage at grounded terminal 37, while electrodes 28, 29 and 30–32 are shown respectively connected to −60 volts, +300 v. and +270 v.

An auxiliary fine mesh screen 40 is supported from ceramic ring 19 at an intermediate position between the target assembly 17 and field grid or screen 32. The auxiliary, or stabilizing, screen 40 is connected through supporting post 22*a* with a potential tap along resistance 35 intermediate between the potential of the scanning gun cathode 27 and that of the field grid 32, e.g. +60 v.

Reviewing the operation of the camera tube just described, photoelectrons from photocathode 11 on striking the target assembly 17 with high kinetic energies traverse the thin foil comprising output signal electrode 1, being only slightly retarded thereby, and penetrate the porous emissive layer 2 releasing a proportionately very large number of secondary electrons in the pores thereof as earlier described. It is noted in this connection that if in the device described the total secondary emission current is meausred as the sum of the current collected on conductive plate 1, and the current flowing to the field grid 32, such total secondary emission current will be found to exceed the input current applied by the incident photoelectrons by a multiplying factor which exceeds many times, e.g. more than hundred tims, the secondary emission ratio previously referred to. This is due to the fact that each electron sustains a large number of impacts and collisions in the porous material each impact causing secondary emission.

The secondary electrons released in the target assembly 17 are removed by the electric field between the target and field grid 32, thereby leaving positive charges behind them at the scan surface of the target assembly. The distribution of these positive charges precisely reproduces the pattern of the primary photoelectrons striking the side of the target directed towards the photocathode, and hence the brightness distribution pattern in the image projected on the photocathode, but is greatly increased in intensity as compared to the charge distribution created by the photoelectrons, owing to the secondary emission effect, thus providing considerable gain. This positive charge distribution in the target is not instantly dissipated but persists for a very short yet non negligible time owing to the low electric conductivity of the target in directions parallel to its general plane.

This pattern of positive charge distribution across the target is now read by means of the scanning electron beam in the following manner. The electrons emitted by the electron gun are first axially accelerated and focussed by the combined action of the electrostatic electrodes 28–29–30 and electromagnetic coils 33 so as to be formed into a narrow beam, which is scanned across the target screen by the action of the deflecting yokes such as 38–39. The axial acceleration of the electrons in this scanning beam proceeds as far as the field grid 32, after which the electrons are retarded by the reverse decelerating field so that on striking the surface 3 of the target 17 their residual energy is only that corresponding to the potential difference between the cathode 27 and the target. This potential difference is zero in the absence of a picture beam striking the opposite side of the target from the photocathode, but in the presence of such a beam the scanning electrons will strike every illuminated area of the target surface 3 with an energy proportional to the positive charge stored in that area and therefore proportional to the degree of illumination thereof as will be understood from the foregoing disclosure. Thus the effect of the scanning beam is to nullify the positive charges on the target, or in other words to equalize the charge distribution pattern formed on the target, so that in the steady state the potentials at all points of the target become established at a uniform equilibrium value close to zero, the reference potential at terminal 37. This equalizing process generates a variable current on output line 26 which at any instant of time represents the degree of illumination of the target area being scanned at that instant.

Figure 1:
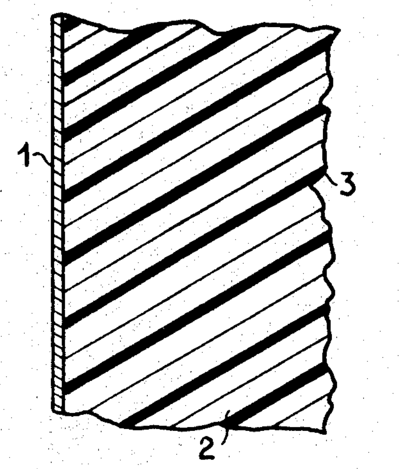

When the target screen 17 is constructed in the conventional manner earlier described with reference to FIG. 1, it has frequently occurred that in strongly illuminated areas of the target screen, corresponding to highlights of the picture projected on the photocathode 11, the positive charge resulting from the expulsion of secondary electrons from that area could be so high as to cause the potential in that area momentarily to rise to a value so high between successive scanning times, that the scanning electrons will strike that area with an energy exceeding the divergence energy threshold, earlier referred to as $E_1$, for which the secondary emission ratio for the constituent substance of the target exceeds unity. The scanning electrons would then produce secondary emission from such areas, further increasing the positive charges thereat, instead of cancelling said positive charges as they should for proper operation. Such abnormal charge increase in a target area can continue until the potential of this area becomes equal to that of the field grid 32. This area no longer contributes then to the provision of an output signal, which is equivalent to a local dazzling of the tube. In conventional tubes of this type, therefore, it has been customary to arrange the auxiliary or stabilizing grid 40 in such a manner that it would act to limit the target potential at a maximum value less than the threshold value $E_1$ for the substance from which the target is made. For this purpose, stabilizing grid 40 was connected to a potential substantially less than the divergence threshold potential $E_1$ of the target material and was positioned at that point along the tube axis at which the equipotential surface corresponding to said threshold potential $E_1$ would normally be located in the absence of the stabilizing grid. For example, if the target is made of magnesia, $E_1$=20 volts approximatively, and the stabilizing grid 40 had to be connected to about 10 or 15 volts potential. Further, in a normal tube construction the 20 volts equipotential would be located about 0.2 mm. from the target surface, and that is where the stabilizing grid 40 would have to be positioned. Such a set-up would have objectionable consequences in regard to the efficiency of the tube.

In the first place, the maximum potential differences on the screen are limited to the low maximum value of 10 or 15 volts, correspondingly limiting the amplitude of the useful output signal. Further, the close positioning of the stabilizing grid adjacent the target screen increases the output capacity of the tube, a circumstance that further diminishes the useful output signal.

When however the target screen 17 is constructed according to the teachings of this invention as described with reference to FIGS. 2, 3 or 4, it is evident that the stabilizing grid 40, if provided, would be connected to a considerably higher potential, related to the divergence threshold potential $E_{1B}$ of the substance constituting the over-layer 4 or 5. If the over layer is silica for instance, $E_{1B}$=55 volts approximately, and the grid 40 may be connected to a potential of 50 volts, correspondingly increasing the maximum amplitude of the output signals. Further, since 55 volts equipotential surface is located considerably farther away from the target the grid will likewise be positioned farther away, say about 0.5 mm. or more from the surface of target 17. The output capacitance is thus very greatly diminished. In many cases the stabilizing grid 40 can be altogether omitted when a composite target screen assembly according to the invention is used.

It will be understood that various modifications may be made in the exemplary embodiments illustrated and described without exceeding the scope of the invention. For example, the improved target structure may include an insulating plate located ahead of the conductive plate electrode 1 (see FIGS. 2–4) in the direction of incidence of the primary photoelectrons, e.g. a 0.05 micron thick alumina plate capable of supporting the target structure but substantially permeable to said primary electrons though exhibiting a predetermined degree of absorption in respect to them. The thickness of the conductive plate 1 may then be reduced e.g. to 0.03 micron. While the invention has been primarily disclosed in its application to a TV camera or picture pickup tube, it is capable of many other applications. As one further exemplary use, the improved target structure may be used in a signal memory storage tube, in which case the photocathode 11 may be replaced, as the source of primary electrons, by a cathode gun or other source device providing a focussed, deflectable beam of writing electrons operable for recording desired information across the surface of the target electrode. As earlier indicated herein, the output signal from the tube instead of being derived on an output line 26 connected to plate 18, may be derived from an electron multiplier device positioned in the tube section 9, e.g. in the form of an annular collector, so as to receive the reflected scanning electrons.

What I claim is:

1. An electron discharge device comprising:

an evacuated envelope;

means positioned in one section of the envelope for producing a high energy electron beam having a prescribed density pattern representative of an image;

means positioned in another section of the envelope for producing and deflecting a low energy scanning beam of reading electron;

a secondary emission conductivity target structure positioned between said high energy beam producing means and said low energy beam producing means;

field creating means positioned in spaced relation to said target for creating a field to remove the secondary electrons excited by said high energy electron beam and to leave corresponding positive charges therein in a pattern corresponding to said density distribution pattern across the high energy beam, which charges are neutralized by said low energy electron beam; and means connected for response to the degree of charge neutralization for producing a variable current signal representing said density distribution pattern across said high energy beam; and wherein said target structure comprises:

a plate element (1) of conductive material exposed and permeable to said high energy beam;

a main storage layer (2) of a porosity in the order of about 2% of compact density and having one side bonded to the side of said plate element remote from the side thereof exposed to said high energy beam and comprising a porous material having high resistivity and high secondary emission properties whereby to have substantial secondary emission excited in the pores thereof by the high energy electrons penetrating thereinto;

and means avoiding the formation of secondary electrons at the other side of said main storage layer upon scanning by said low energy scanning beam comprising a layer (6) of a material having high resistivity and high secondary emission properties and being substantially less porous than said main layer material; and a metal film (5) having a surface resistance not less than about $10^{12}$ ohms per square as measured parallel to the general surface of the structure, said layer of the material of high resistivity (6) and high secondary emission property providing a relatively smooth base for said metal film (5);

said metal film (5) being located at the other side of said main layer so as to be scanned by said low energy scanning electron beam, the material of said metal film differing from the material of the main storage layer (2) and being of a porosity in the order of about 20% of compact density, and having substantially lower secondary emission properties than the material of said main layer (2) and a voltage threshold value at which the secondary emission ratio thereof exceeds unity which is substantially higher than the corresponding voltage threshold value for the material of said main layer (2), so as to have no substantial secondary emission excited therein by said low energy scanning electron beam.

2. Device according to claim 1 wherein said metal film (5) comprises a film of silver, gold, or platinum about 0.01 micron thick.

References Cited

UNITED STATES PATENTS

| | | | |
|---|---|---|---|
| 2,544,754 | 3/1951 | Tpwnes | 313—65A |
| 2,677,715 | 5/1954 | Auwarter | 313—65A |
| 2,898,490 | 8/1959 | Damon | 313—65A |
| 2,898,499 | 8/1959 | Sternglass et al. | 313—65AX |
| 2,900,555 | 8/1959 | Schneeberger | 313—65AX |
| 2,910,602 | 10/1959 | Lubszynski et al. | 313—65A |
| 3,002,124 | 9/1961 | Schneeberger | 313—103X |
| 3,051,860 | 8/1962 | Haine et al. | 313—65A |
| 3,128,406 | 4/1964 | Goetze et al. | 313—103X |
| 3,315,108 | 4/1967 | Heagy | 313—65A |
| 2,776,387 | 1/1957 | Pensak | 313—65A |
| 2,887,596 | 5/1959 | Van Rijssel et al. | 313—65 |

FOREIGN PATENTS

| | | | |
|---|---|---|---|
| 708,449 | 5/1954 | Great Britain | 313—65 |
| 879,569 | 10/1961 | Great Britain | 313—65 |
| 1,137,910 | 12/1968 | Great Britain | 313—65A |
| 681,355 | 10/1966 | Belgium | 313—65A |

ROBERT SEGAL, Primary Examiner

U.S. Cl. X.R.

313—94, 103